US009799027B2

(12) United States Patent
Pasa et al.

(10) Patent No.: US 9,799,027 B2
(45) Date of Patent: Oct. 24, 2017

(54) SYSTEM AND METHOD TO ENABLE A NETWORK OF DIGITAL WALLETS

(71) Applicant: MasterCard International Incorporated, Purchase, NY (US)

(72) Inventors: Mehmet Pasa, Westport, CT (US); Michael J. Friedman, Norwalk, CT (US); Ngassam Ngnoumen, Chesterfield, MO (US); Celine Martig, Greenwich, CT (US); Shoshana C. Rosenfield, Rye, NY (US); Rupa Subramanian, Norwalk, CT (US); Zavida Mangaru, Valley Stream, NY (US); John F. Cacioppo, Foristell, MO (US)

(73) Assignee: Mastercard International Incorporated, Purchase, NY (US)

( * ) Notice: Subject to any disclaimer, the term of this patent is extended or adjusted under 35 U.S.C. 154(b) by 271 days.

(21) Appl. No.: 13/746,904

(22) Filed: Jan. 22, 2013

(65) Prior Publication Data
US 2013/0191227 A1    Jul. 25, 2013

Related U.S. Application Data

(60) Provisional application No. 61/588,505, filed on Jan. 19, 2012, provisional application No. 61/642,729,
(Continued)

(51) Int. Cl.
*G06Q 20/10* (2012.01)
*G06Q 20/40* (2012.01)
(Continued)

(52) U.S. Cl.
CPC ....... *G06Q 20/3674* (2013.01); *G06Q 20/027* (2013.01); *G06Q 20/105* (2013.01);
(Continued)

(58) Field of Classification Search
CPC .... G06Q 20/10; G06Q 20/105; G06Q 20/363; G06Q 20/367; G06Q 20/3674; G06Q 20/40
(Continued)

(56) References Cited

U.S. PATENT DOCUMENTS 6,327,578 B1 * 12/2001 Linehan ................ G06Q 20/02
705/65
6,873,974 B1 * 3/2005 Schutzer ............... G06Q 20/10
235/379
(Continued)

FOREIGN PATENT DOCUMENTS

EP    1168264 A2    11/2000
EP    1758053 A1    2/2007
(Continued)

OTHER PUBLICATIONS

Schuh et al., Who Gains and Who Loses from Credit Card Payments? Theory and Calibrations. Public Policy Discussion Papers,. Federal Reserve Bank of Boston, Consumer Payments Research Center, Aug. 31, 2010 (61 Pages).*
(Continued)

*Primary Examiner* — Barbara Joan Amelunxen
(74) *Attorney, Agent, or Firm* — Budzyn IP Law, LLC

(57) ABSTRACT

A method for authorizing a digital wallet transaction initiated by a consumer from a merchant web site or app includes providing an acceptance mark on a merchant landing page associated with the merchant web site or app for initiating the digital wallet transaction, the acceptance mark comprising a link to a host server accessing an acceptance network for authorizing payment, the acceptance network comprising a plurality of digital wallets. A wallet selector switch allows selection of a wallet, the transaction is routed to the selected wallet, a payment card and shipping address are selected and the transaction is redirected back to the merchant with
(Continued)

purchase details for authorizing and completing the digital wallet transaction. The wallets can include federated and non-federated cobranded wallets and partner-hosted wallets. Direct provisioning with partner credentials and automatic update of consumer details is provided in a federated cobranded wallet.

20 Claims, 10 Drawing Sheets

Related U.S. Application Data filed on May 4, 2012, provisional application No. 61/642,792, filed on May 4, 2012, provisional application No. 61/642,799, filed on May 4, 2012.

(51) Int. Cl.
  *G06Q 20/36* (2012.01)
  *G06Q 20/20* (2012.01)
  *G06Q 20/02* (2012.01)
  *G06Q 20/12* (2012.01)

(52) U.S. Cl.
  CPC ............ *G06Q 20/12* (2013.01); *G06Q 20/20* (2013.01); *G06Q 20/363* (2013.01); *G06Q 20/367* (2013.01)

(58) Field of Classification Search
  USPC .................................. 705/41, 44, 39, 67, 64
  See application file for complete search history.

(56) References Cited

U.S. PATENT DOCUMENTS

| | | | | |
|---|---|---|---|---|
| 7,343,351 | B1* | 3/2008 | Bishop | G06Q 20/341 705/64 |
| 7,366,703 | B2* | 4/2008 | Gray | G06Q 20/02 705/64 |
| 7,398,250 | B2* | 7/2008 | Blinn | G06Q 20/10 705/35 |
| 7,505,941 | B2* | 3/2009 | Bishop | G06Q 20/027 235/435 |
| 8,165,961 | B1* | 4/2012 | DiMartino | G06Q 20/105 705/41 |
| 2001/0027441 | A1* | 10/2001 | Wankmueller | G06Q 20/04 705/41 |
| 2001/0037312 | A1* | 11/2001 | Gray | G06Q 20/02 705/67 |
| 2002/0016765 | A1 | 2/2002 | Sacks | |
| 2002/0042776 | A1 | 4/2002 | Woo et al. | |
| 2004/0143550 | A1* | 7/2004 | Creamer | G06Q 20/04 705/41 |
| 2004/0260647 | A1* | 12/2004 | Blinn | G06Q 20/10 705/41 |
| 2005/0187883 | A1* | 8/2005 | Bishop | G06Q 20/027 705/67 |
| 2006/0053056 | A1* | 3/2006 | Alspach-Goss | G06Q 20/10 705/14.17 |
| 2007/0042767 | A1* | 2/2007 | Stepanian | G06F 1/1626 455/420 |
| 2009/0048887 | A1* | 2/2009 | Bishop | G06Q 20/10 705/39 |
| 2010/0211501 | A1 | 8/2010 | Ogawa | |
| 2011/0029400 | A1 | 2/2011 | Scipioni | |
| 2012/0143752 | A1* | 6/2012 | Wong | G06Q 20/105 705/41 |
| 2012/0158584 | A1* | 6/2012 | Behren | G06Q 20/10 705/41 |
| 2012/0233073 | A1* | 9/2012 | Salmon | G06Q 20/381 705/44 |
| 2013/0054454 | A1* | 2/2013 | Purves | H04L 67/306 705/41 |
| 2013/0179337 | A1* | 7/2013 | Ochynski | G06Q 20/065 705/40 |
| 2013/0179347 | A1* | 7/2013 | Soderstrom | G06Q 40/00 705/44 |
| 2013/0218769 | A1* | 8/2013 | Pourfallah | G06Q 20/10 705/44 |
| 2013/0246261 | A1* | 9/2013 | Purves | G06Q 20/105 705/41 |
| 2014/0019352 | A1* | 1/2014 | Shrivastava | G06Q 20/3674 705/41 |
| 2014/0279546 | A1* | 9/2014 | Poole | H04B 5/0031 705/44 |
| 2014/0289110 | A1* | 9/2014 | Levchin | G06Q 20/02 705/41 |
| 2014/0337175 | A1* | 11/2014 | Katzin | G06Q 20/204 705/26.62 |
| 2015/0019944 | A1* | 1/2015 | Kalgi | G06Q 20/227 715/205 |
| 2015/0026049 | A1* | 1/2015 | Theurer | G06Q 20/36 705/41 |

FOREIGN PATENT DOCUMENTS

| | | | | |
|---|---|---|---|---|
| JP | EP 1758053 A1 | * | 2/2007 | ............ G06Q 20/32 |
| JP | 2009-230626 A | | 10/2009 | |
| JP | 2009230626 | * | 10/2009 | ............ G06K 17/00 |
| KR | 10-2005-0019674 A | | 3/2005 | |
| KR | 20050019674 | * | 3/2005 | ............ G06F 17/60 |
| WO | 01/16900 A2 | | 3/2001 | |
| WO | 01/43033 A1 | | 6/2001 | |
| WO | 01/61659 A1 | | 8/2001 | |
| WO | 02/05231 A2 | | 1/2002 | |
| WO | 02/23452 A1 | | 3/2002 | |
| WO | 02/25604 A1 | | 3/2002 | |

OTHER PUBLICATIONS

Schuh et al., Who Gains and Who Loses from Credit Card Payments? Theory and Calibrations. Public Policy Discussion Papers, Federal Reserve Bank of Boston, Consumer Payments Research Center, Aug. 31, 2010.*

Google Wallet; www/google.com/wallet/ (http://www.google.com/wallet), Jan. 5, 2012.

* cited by examiner

Proposed UI – Checkout Flow

SYSTEM AND METHOD TO ENABLE A NETWORK OF DIGITAL WALLETS

CROSS REFERENCE TO RELATED APPLICATIONS

This application claims the benefit of priority to each of the following U.S. Provisional Applications: Ser. No. 61/588,505, filed Jan. 19, 2012; U.S. Ser. No. 61/642,729, filed May 4, 2012; U.S. Ser. No. 61/642,792, filed May 4, 2012; and U.S. Ser. No. 61/642,799, filed May 4, 2012, the content of each of which is incorporated herein in its entirety by reference.

FIELD OF INVENTION

The present disclosure relates to digital wallets, more particularly, to a system and method for enabling a network of digital wallets.

BACKGROUND

The use of a digital wallet has quickly gained popularity, both for use in remote-based platforms and in "tap-to-pay" point-of-sale transactions using a cellular telephone, for example. Currently, there exist several different forms of digital wallets offered by different financial institutions, issuers and so on, and many more are in development. Such services are becoming available under many different brands including those of credit card suppliers and retailers, each of which may interface with different financing companies, and can be offered on different platforms, including point-of-sale technology (e.g., NFC), mobile applications, and remote on-line systems.

As consumers use digital wallets with more regularity, it is desirable to allow a diverse number of choices for competing brands of digital wallets according to a consumer preference. However, this can create a complicated system of overlapping functionality and interfacing menus for both the consumer, wishing to have more than one payment option, and merchants, who will need to process the different digital wallets through different channels. Accordingly, there is a need for a system to enable a network of digital wallets, which provides a link between multiple consumer interfaces provided on merchant web sites and an acceptance network for authorizing a purchase from any one of various digital wallet providers.

SUMMARY

The present invention provides a system for enabling a network of digital wallets which includes a common link to an acceptance network for authorizing a digital wallet purchase that allows multiple consumer interfaces via merchant landing pages and integration with various wallet providers. The acceptance network is preferably accessed through an acceptance mark button on a graphical interface provided to consumers on merchant landing pages. Selection of the acceptance mark provides access to various digital wallet services and providers for initiating a purchase. Accordingly, multiple merchant web sites can be linked through a single digital wallet acceptance mark, which provides access to a switch through which a wallet of choice is accessed by the consumer for payment at a remote location or at point-of-sale.

The system to enable a network of digital wallets also provides the features and functionality required to decouple the acceptance network from each digital wallet consumer interface.

The present invention also provides a method for authorizing a digital wallet transaction initiated by a consumer from a merchant web site. The method provides for payment using one of a plurality of digital wallets in the acceptance network.

A method for authorizing a digital wallet transaction initiated by a consumer from a merchant web site or app, in accordance with the present disclosure, includes providing an acceptance mark on a merchant landing page associated with the merchant web site or app for initiating the digital wallet transaction. The acceptance mark comprises a link to a host server for accessing an acceptance network for authorizing payment. The acceptance network comprises a plurality of digital wallets. A digital wallet is selected and purchase details including a payment card and a shipping address are selected for the transaction. An Access Token and a checkout resource URL associated with the digital wallet are generated by the host server, and the merchant web site or app sends the Access Token to the checkout URL to retrieve the purchase details for authorizing and completing the digital wallet transaction using the selected digital wallet.

In one aspect, a method for authorizing a digital wallet transaction initiated by a consumer from a merchant web site or app includes providing an acceptance mark on a merchant landing page associated with the merchant web site or app for initiating the digital wallet transaction, the acceptance mark comprising a link to a host server accessing an acceptance network for authorizing payment, the acceptance network comprising a plurality of digital wallets; routing the transaction to a digital wallet selected by the consumer from the plurality of digital wallets, the selected digital wallet capturing and validating the log-in credentials, the selected digital wallet capturing a payment card and a shipping address selected by the consumer for the digital wallet transaction; routing the transaction to the host server with purchase details including the payment card and the shipping address, the host server generating a postback merchant URL associated with the merchant web site or app, an Access Token and a checkout resource URL associated with the selected digital wallet for retrieving the purchase details; and redirecting the transaction back to the merchant web site or app using the postback merchant URL, the merchant web site or app sending the Access Token to the checkout resource URL associated with the selected digital wallet to retrieve the purchase details for authorizing and completing the digital wallet transaction.

In another aspect, the method further includes displaying an interstitial page comprising a wallet selector switch in response to the consumer selecting the acceptance mark, the consumer selecting the digital wallet from the plurality of digital wallets for the transaction using the wallet selector switch.

In yet another aspect, the selected digital wallet is a default wallet, the default wallet being selected prior to the consumer selecting the acceptance mark. The method further comprises displaying an interstitial page associated with the default wallet in response to the consumer selecting the acceptance button.

Additional aspects of the method wherein the selected digital wallet is the default wallet can include the consumer establishing a default payment card and a default shipping address associated with the default digital wallet prior to selecting the acceptance mark, and providing an express checkout button associated with the default wallet, the default payment card and the default shipping address being captured for the transaction in response to the consumer selecting the express checkout button.

If the consumer is a recognized user of the acceptance network, in one aspect, the default wallet corresponds to one of the plurality of digital wallets most recently accessed by the consumer.

In an additional aspect, the selected digital wallet is a partner-hosted wallet, the method further comprising storing the purchase details including the selected payment card and shipping address in a temporary store associated with the checkout URL on the host server, and purging the temporary store in response to the merchant web site or app retrieving the purchase details for authorizing the digital wallet transaction.

In various aspects, the method can further comprise associating a coupon or offer with each of the plurality of digital wallets and displaying the coupon or offer associated with one of the plurality of digital wallets displayed on the wallet selector switch. The coupon or offer may be displayed, in one aspect, in response to the consumer hovering a pointer over the one of the plurality of digital wallets displayed.

Additional aspects of the method may include communicating the coupon or offer associated with the one of the plurality of digital wallets to the merchant web site or app prior to completing the digital wallet transaction, wherein the one of the plurality of digital wallets is the digital wallet selected from the plurality of digital wallets for the transaction.

Additional aspects of the method of the present disclosure can include associating a status with each of the plurality of digital wallets and displaying a graphical indicator of the status on the wallet selector switch.

The status can be associated with a capability to complete a pending transaction using the associated digital wallet, based on at least one of an amount of funds required for the transaction, a balance of available funds in the associated digital wallet, a class or merchant, a type of goods or service being transacted, an expiration of one or more card associated with the digital wallet, and whether a prior transaction using the digital wallet had failed.

In yet other aspects of the methods of the present disclosure, the host server displays a shopping order confirmation page prior to redirecting the transaction back to the merchant web site or app. The shopping order confirmation page includes the purchase details, the purchase details including shipping charges, taxes, and a surcharge rate and charge associated with the digital wallet selected. The methods include dynamically updating the shopping order confirmation page in response to the consumer selecting a different one of the plurality of digital wallets for the digital wallet.

In yet additional aspects, a history toggle can be provided on an interstitial page, the history toggle providing access to the historical purchase data of a recognized consumer of the network of wallets, the historical purchase data including data associated with each payment card registered to the consumer within the acceptance network.

In further aspects, the method includes returning a Request Token generated by the host server in response to the consumer selecting the acceptance mark, the host server generating a verifier associated with the Access Token, and the merchant web site or app capturing the checkout resource URL and the verifier after the transaction is redirected back to the merchant web site or app, the merchant web site or app using the Request Token and verifier to retrieve the Access Token from the host server for sending to the checkout resource URL and retrieving the purchase details.

In still further aspects, the method can include displaying an interstitial page comprising a wallet selector switch and a wallet log-in menu in response to the consumer selecting the acceptance mark, the consumer entering log-in credentials in the wallet log-in menu associated with a digital wallet selected from the plurality of digital wallets for the transaction.

In additional aspects, the selected digital wallet can be a federated co-branded wallet, the interstitial page being displayed and hosted by the host server, the interstitial page comprising a wallet log-in menu, wherein the log-in credentials entered by the consumer in the log-in menu are captured and validated by a partner server against a partner database, the method comprising framing the log-in menu in a widget for accessing the partner server.

These aspects can further include federating the captured log-in credentials to the selected wallet in response to the consumer being recognized by the partner server as an authorized user of another partner-hosted product.

Still further, aspects can include the partner server sending a SAML token and provisioning details of payment cards and shipping addresses associated with the consumer to the federated co-branded wallet displayed on the host server in response to validating the log-in credentials.

If the consumer is a recognized user of the acceptance network, additional aspects can include the partner server automatically updating the details of the payment cards in the federated co-branded wallet associated with the consumer in response to the consumer selecting the federated co-branded wallet for the transaction, the details including consumer contact information, payment cards, and shipping addresses.

If the consumer is recognized by the host server as an unregistered user of the acceptance network, in additional aspects, the method can include automatically creating a new digital wallet account associated with the federated co-branded wallet for the consumer using the captured log-in credentials.

A method is also provided for authorizing a digital wallet transaction initiated by a consumer from a merchant web site or app, the method including: providing an acceptance mark on a merchant landing page associated with the merchant web site or app for initiating the digital wallet transaction, the acceptance mark comprising a link to a host server accessing an acceptance network for authorizing payment, the acceptance network comprising a plurality of digital wallets, the plurality of digital wallets including a federated co-branded wallet; displaying an interstitial page in response to a consumer selecting the acceptance mark, wherein the consumer is a registered user of the acceptance network, the interstitial page displaying a wallet interface to the federated co-branded wallet, the wallet interface being hosted on the host server, the wallet interface comprising a wallet log-in menu framed in a widget for accessing a partner server and a partner database associated with the federated co-branded wallet; capturing and validating the log-in credentials by the partner server against the partner database in response to the consumer entering the log-in credentials in the log-in menu, the partner server sending a SAML token to the federated co-branded wallet hosted by the host server and redirecting the transaction to the host server in response to validating the log-in credentials; provisioning, by the partner server, details of payment cards and shipping addresses associated with the consumer to the federated co-branded wallet on the host server in response to recognizing the consumer as the registered user; displaying a payment interface for capturing a payment card and a shipping address, the payment interface capturing the payment card and the shipping address selected by the consumer for the digital wallet transaction; and redirecting the transaction back to the merchant web site or app after capturing purchase details of the transaction, the purchase details including the payment card and the shipping address selected, the merchant web site retrieving the purchase details for authorizing and completing the digital wallet transaction.

DETAILED DESCRIPTION OF EMBODIMENTS

Figure 1:
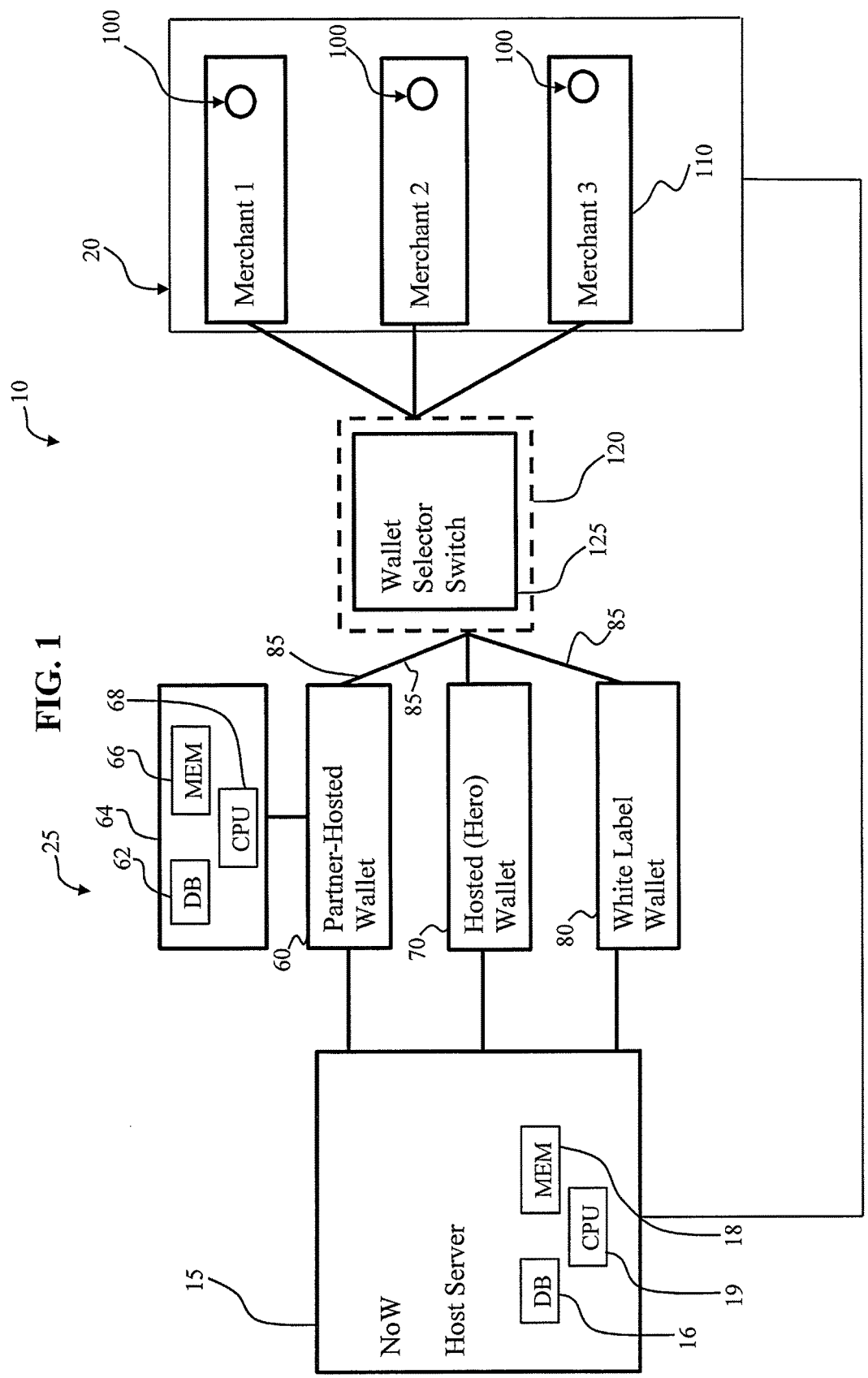
FIG. 1 is a block diagram representation of an embodiment of a system of the present disclosure for enabling a network of digital wallets.

The following sections describe exemplary embodiments of the present invention. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto.

A "digital wallet" is known in the art and can be used by a consumer associated with the digital wallet for making an electronic transaction. Generally, the digital wallet has a data or information component associated with the consumer and transaction data, including payment methods, shipping addresses, billing address and other information. The information component is associated with a consumer interface for the consumer accessing the digital wallet to input necessary information for the transaction. The digital wallet is also associated with a software or services component for authorizing and completing the electronic transaction, including security and encryption for the customer's personal information and for the actual electronic transaction. The system and method of the present disclosure provide the functionality and services required to connect multiple consumer interfaces to a single acceptance network for payment which supports a plurality of digital wallets.

The plurality of digital wallets can include any digital wallet suitable for remote or on-line purchases, including those digital wallets offered as a mobile app, particularly, a mobile phone app.

An "app" is used herein as that term is known, to refer to an application for a mobile device. An app, or mobile app, is a software application designed to run on, for example, smartphones, tablet computers, and other mobile devices.

A merchant page or merchant landing page is a consumer-facing graphical interface accessed from a merchant web site, or app. The acceptance network is preferably accessed by a consumer by selecting an acceptance mark provided on the merchant page.

A partner is a bank, retailer, or other third-party seeking to integrate its proprietary wallet solution into the acceptance network of digital wallets, providing its users with access to the network of wallets services.

A Request Token is used as that term is known in the art and is a request for authorized access to a service using, for example, an industry standard security OAuth, which allows third party web sites to share user data without requiring additional credentials. The network of digital wallets preferably uses this method for securing transactions to and from the host network of wallets' services. Additional tokens are used, such as an Access Token, to provide a location or URL (Uniform Resource Locator) from which data can be accessed, and a Verifier Token, to verify a party requesting access to data.

OpenAPI is an industry standard for enabling services to be easily shared across third party providers. The digital wallets preferably use this standard to interconnect the host network of wallets services with partner services.

The various services and applications referred to herein are executable programs running on a host (network of digital wallets or "NoW") server, and/or on a partner server, as indicated, according to the type of digital wallet. The flow of a method for completing a purchase initiated from a merchant page, from a merchant web site or app, is directed by the hosted program code to switch between wallets and to direct the flow between a merchant and a digital wallet for completing a purchase. A processing device associated with the merchant web site or app executes the back-end services required to interact with the host server and digital wallets to complete the purchase and authorize a transaction with the digital wallet.

The corresponding method steps for completing a purchase are preferably stored in memory associated with the host server and with the particular digital wallet, and executed by a processing device. Depending on the type of wallet selected by a purchaser, cardholder shipping and other details necessary to complete a transaction are stored in a database associated with a partner server hosting a partner wallet, or in a database associated with the host server.

Referring to FIG. 1, an embodiment of a system to enable a network of digital wallets 10 includes a host ("Now") server 15 with secure databases 16 for storing cardholder, card and shipping data associated with various wallets offered within the network of digital wallets. The server 15 includes services for facilitating and monitoring connectivity between merchants 20 and an acceptance network 25 for authorizing a purchase. The acceptance network includes a plurality of digital wallets. Services and resources offered from the host server 15 to wallet providers and merchants participating in the network of wallets preferably include application programming interfaces (API's) for shared services for integrating wallet providers and merchants into the network of wallets, standards for consumer authentication, and the availability of, and ability to select from, multiple consumer interfaces, depending on the type of digital wallet a wallet provider (partner) chooses to offer. The services, applications, and executable programming steps for performing the methods of the present disclosure are preferably stored in memory 18 associated with the host server 15 and executed by a processing device 19.

Referring still to FIG. 1, digital wallet options include a partner-hosted ("partner") wallet 60, which maintains all consumer details and purchase data and consumer log-in credentials in the partner's own secure database 62 and is hosted by a partner server 64 providing the partner wallet web site 60. Additional options include a hero/retail wallet 70 hosted on the NoW server 15, which maintains all consumer details, purchase data, and consumer login credentials in the host's databases 16, and variations of a white-label wallet 80, having a mix of control shared between the partner and host. The white-label wallets can include a federated and non-federated white-label wallet, embodiments of which are described further herein.

Figure 2:
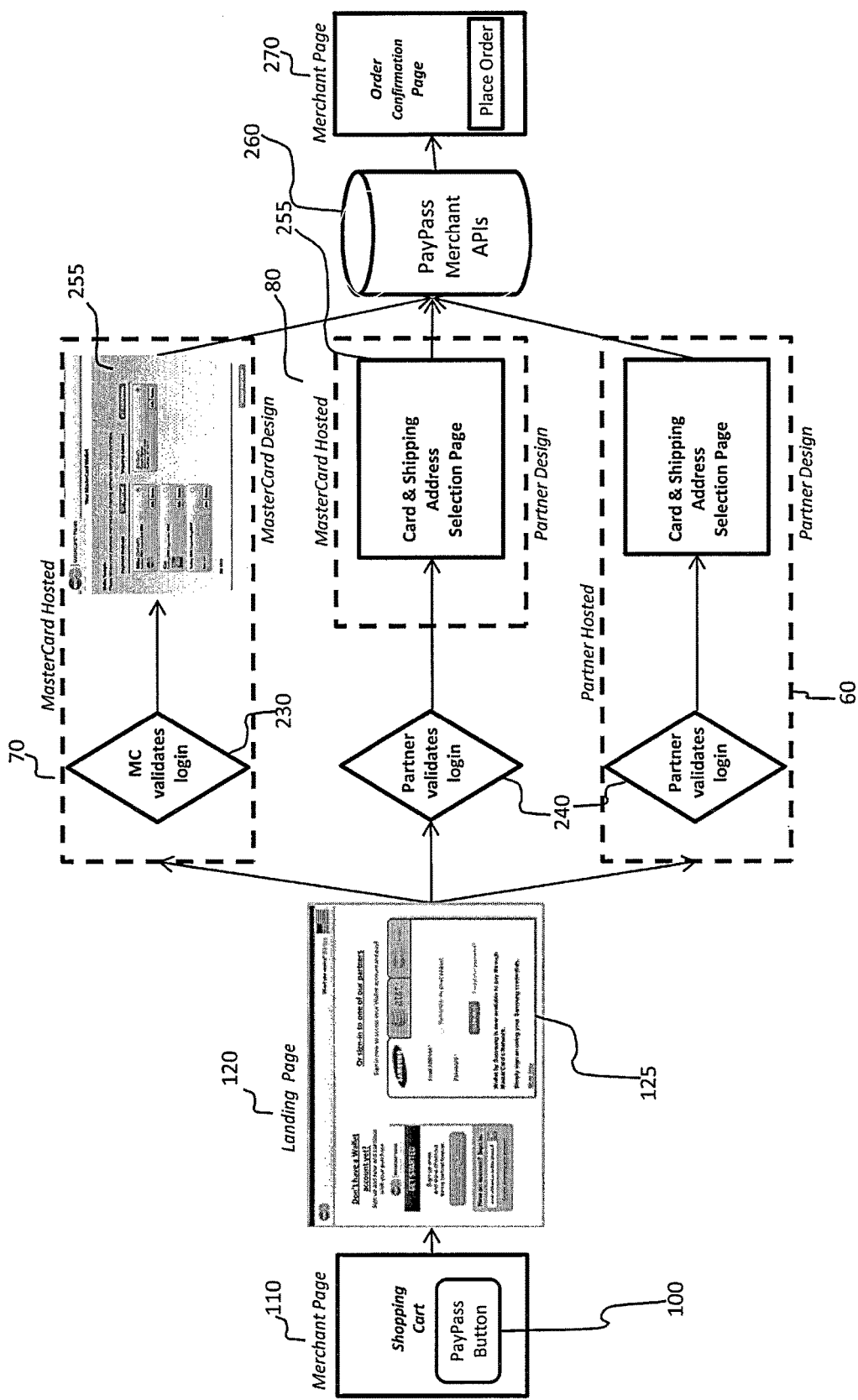
FIG. 2 is a block diagram representation of an embodiment of a method for enabling a network of digital wallets.

Referring to FIG. 2, in one embodiment of a method of the present disclosure for enabling a network of digital wallets, and for authorizing a digital wallet transaction initiated by a consumer through the network of digital wallets, an icon or acceptance mark 100 is preferably provided as a link on a merchant landing page 110 to a switch 125 for routing the consumer to any digital wallet in the acceptance network 25. The purchaser selects the icon or acceptance mark 100 representing the network of wallets displayed on a merchant's shopping cart landing page 110. The purchaser is brought to an interstitial landing page 120 to facilitate interaction with the network of wallets. The interstitial page 120 includes a wallet selector 125 for switching between the wallets available to the purchaser. In the embodiment of a switch selector shown in FIGS. 2 and 3A, the switch capability is provided by selection of the appropriate tab displaying the desired wallet. Each tab of the wallet selector is associated with a hyperlink to a particular URL associated with the digital wallet, so that selection of a particular tab displays the associated digital wallet landing page.

The consumer selects one of the wallets and the payment process proceeds along one of the paths 85, in accordance with the type of digital wallet selected. As shown schematically in the embodiment of FIG. 1, the different types of digital wallets can include hero/retail NoW-hosted wallets 70; federated or non-federated co-branded or white-label wallets 80; and partner-hosted wallets 60.

Figure 3A:
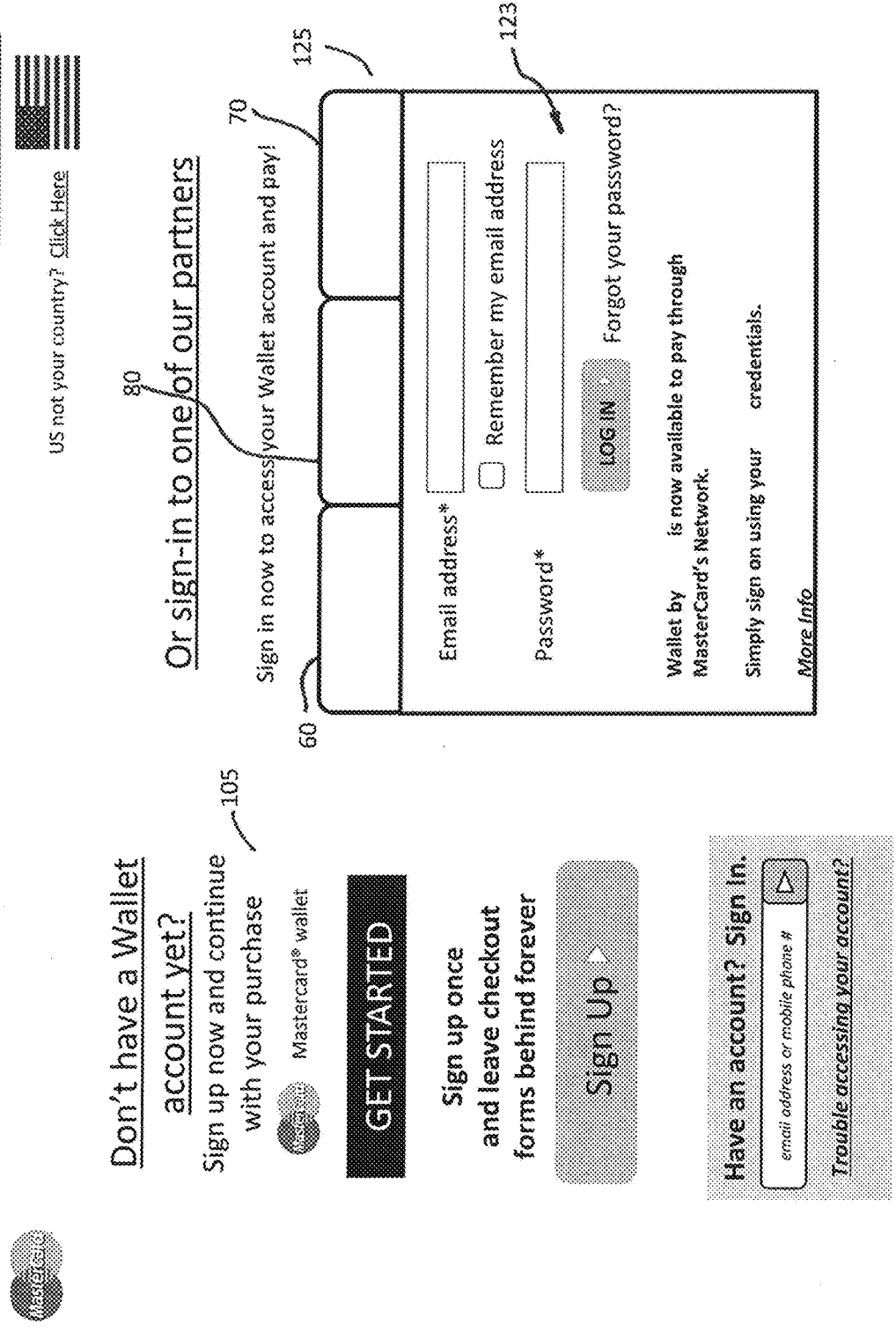
FIG. 3A is a representation of an embodiment of a user log-in interface and switch for accessing the network of digital wallets in accordance with the present disclosure.

In the embodiment shown in FIG. 2, the consumer is an unrecognized user. An unrecognized user includes a consumer who logs in for the first time, not yet registered with the network of wallets. An unrecognized user also includes a consumer who has cleared cookies previously stored on the user's device to allow identification. Referring to FIG. 3A, upon selection of the acceptance button 100, the unrecognized user is directed to an embodiment of the interstitial landing page 120 which allows the unrecognized user to create a wallet, and/or to select a wallet for payment. In this embodiment, the page is hosted by the network of wallets host server. It also includes a wallet selector 125 for selecting and signing in to different wallets. Preferably, an option for creating a hero wallet account 105 is also provided so that a new account can be created by a first time user of NoW directly through a menu 105 on the landing page 120.

In additional embodiments, if the consumer is a recognized user of the network of wallets, selecting the acceptance mark 100 automatically routes the payment process through the switch to a default digital wallet web site, displaying the default digital wallet to the consumer. The default wallet can be, for example, the last wallet the consumer used, or one pre-selected as the default by the consumer.

A consumer is referred to as a recognized user of the network of wallets, if recognized, for example, by a cookie or a fingerprint or MAC address of the machine from which they are browsing, and is further recognized by the network of wallets as having login credentials associated with one of the digital wallets in the network of wallets.

In preferred embodiments, the interstitial landing page that is displayed with an open wallet, regardless of whether it is a default or user-selected wallet, will preferably still include the digital wallet selector 125, along with the wallet branding and sign-in menu for the user's default or user-selected wallet. Accordingly, an option to access (or create) alternate (or additional) digital wallets remains available to the consumer until completion of the checkout and purchase process.

Referring to FIG. 3A, in various embodiments, the interstitial landing page 120 can offer a consumer a selection of his or her country of residence. Depending on the country selected, a different menu of digital wallets available to the consumer can be displayed.

It should be appreciated that the tabulated menu shown in FIGS. 2 and 3A is one non-limiting embodiment of a wallet selector of the present invention. One of ordinary skill in the art can appreciate that any number of variations of wallet selectors for accessing one of the digital wallets available in the network are within the scope of the invention, including a revolving pane design and a daisy wheel. The wallet selector can additionally include functionality to allow a consumer to compare different advantages of the various wallets prior to completing the purchase and checkout process. For example, various embodiments of the switch 125 can include displaying information such as specific offers or coupons associated with each wallet choice in the switch 125. In one embodiment, a coupon or offer is displayed to the purchaser, for example, as a pop-up, when a pointer is hovered over the associated wallet. These offers or coupons can be communicated to the merchant upon selection of the wallet, and are applied during the checkout process.

Figure 3B:
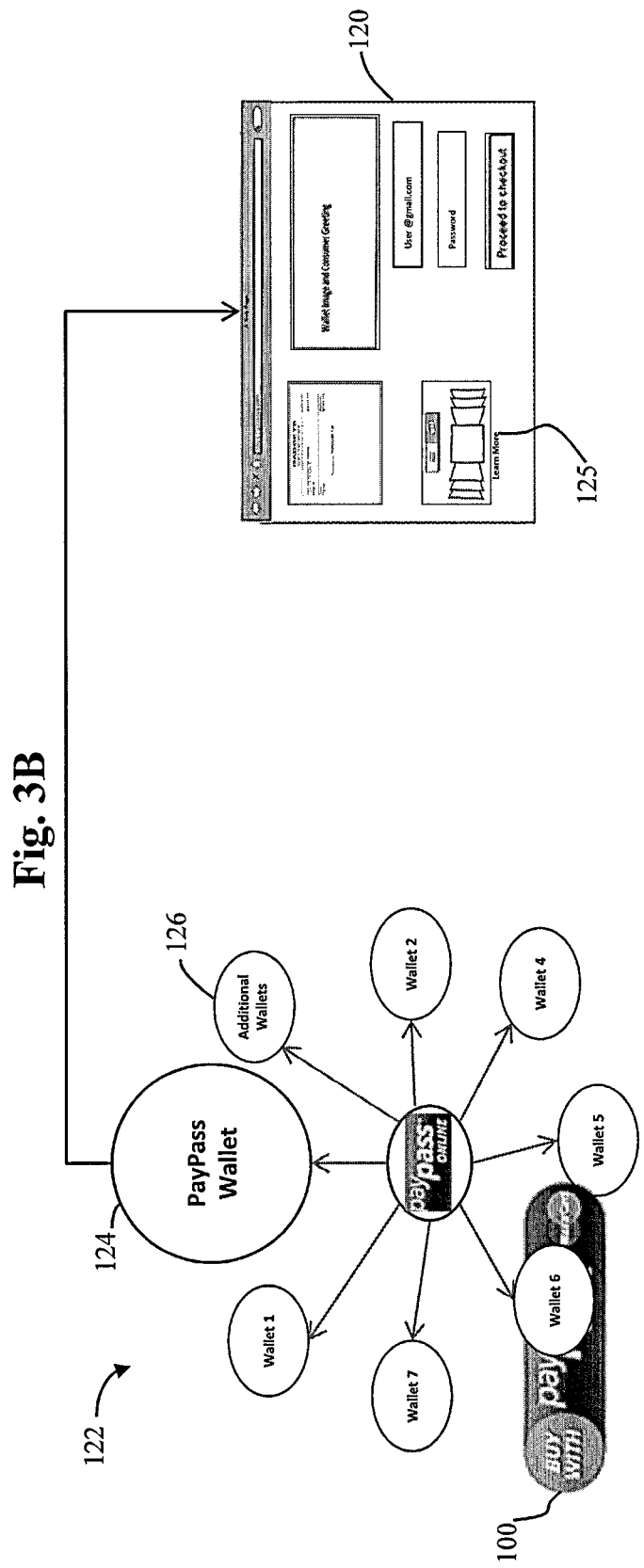
FIG. 3B is a representation of another embodiment of a user interface and another embodiment of a switch for displaying and accessing the digital wallets in accordance with the present disclosure.

Referring to FIG. 3B, in one embodiment of the wallet selector 125, a daisy wheel 122 is used to display all wallet options available to a particular user after selection of the acceptance mark 100. A last-used wallet prong 124 of the daisy wheel (assuming a recognized purchaser), or other preferred wallet prong, can be highlighted, for example, by displaying the prong more prominently than the other available wallets. An "additional wallets" prong 126 can provide a link to an additional wallet selector showing more digital wallets. In various embodiments, hovering a pointer over any one of the prongs highlights that selection, and can simultaneously display the interstitial page 120 for a particular digital wallet, in addition to various coupons and offers associated with a purchaser's use of that wallet for the purchase. Incentives to create a digital wallet to unrecognized users of that particular digital wallet can likewise be displayed.

Referring again to FIG. 2, the purchaser may choose from among the available digital wallets, which can include a Hero wallet 70, a wallet operated and maintained by the provider or host 15 of the network of wallets, in this example, by assignee MasterCard®. The digital wallets can also include a white-label or co-branded wallet 80 that is maintained and operated by the provider or host 15 of the network of wallets, but which carries the branding of a partner entity in the network of wallets. In this embodiment, the purchaser may also choose a partner wallet 60, one which is maintained and operated by a partner entity.

Referring to FIG. 3A, the consumer enters login credentials on the selected wallet page, which can be hosted on the network-of-wallets host server or on the selected partner server. Preferably, the interstitial landing page 120 captures the log-in credentials for a consumer, for example, a User ID, such as an email address, along with an associated password. The payment process continues by validating the log-in credentials of the purchaser and encrypting the fields with a key issued by the wallet owner of the selected digital wallet to insure the login credential integrity. This process will differ depending on the type of wallet selected. For a hero wallet 70, the host validates against its own database 230, while for a partner-hosted wallet 60, the partner validates 240 against its own database. As described further in reference to FIGS. 5A and 5B, for various embodiments of a co-branded 80 wallet, while the log-in page can be hosted on the NoW server, the login credentials can be validated against the partner's database 240, or against the host database, where the host database maintains the partner's customer database.

Once the log-in credentials are validated, in various embodiments, a payment card and shipping address selection page 255 is displayed so that the consumer can choose a payment method. The choice of wallet will determine from which database the page 255 will be retrieved, e.g., from a partner database or from a host (NoW) database, and how this page is presented to the consumer. For example, in one embodiment, a co-branded wallet 80 is hosted by the network of wallets (MasterCard®) services, but the partner creates and controls the design of the page displayed to the consumer, which will follow the partner's brand. In this way, the network of wallets system enables partners to skin the MasterCard® host services.

Once the consumer selects and confirms the card selected for payment and the shipping address, the validation and shipping selection information is preferably aggregated and transmitted to the merchant through application programming interfaces (API's) 260 integrated on the merchant web site. The merchant retrieves the consumer data provided and displays an order confirmation page to the consumer 270.

The system and method to enable a network of digital wallets of the present disclosure is a token mediation driven process connecting a merchant network 20 to a network of digital wallet providers 25. A system flow diagram of a checkout transaction is provided in FIG. 4A using a partner-hosted wallet 60 in a network of digital wallets hosted by MASTERCARD® under its PAYPASS™ trademark, and a hero ("PayPass") wallet 402 provided by the network of wallets host ("PayPass" services). A corresponding sequence diagram is provided in FIG. 4B. For the partner-hosted wallet 366, the partner maintains all control and responsibility for maintaining consumer login details and validation, storing consumer login and account management data and other consumer data in its own secure database. In addition, the partner designs and hosts the partner wallet web site landing pages.

As described further herein, there are a few points of partner integration into the checkout process, where partners must either accept or invoke transactions from a host wallet services layer 300: a Checkout Initialization, Address Verification, and Checkout Authorization. The Checkout Initialization process defines what happens when the user chooses to make a payment with a particular wallet, in this case, one that is partner hosted. The Checkout Authorization process continues after the user selects the card and shipping options and is ready to complete the checkout. It is invoked, in this case, by the partner-hosted wallet to authorize the merchant to access consumer's checkout data, and is hosted by the network of wallets' host (PAYPASS™) server. The Address Verification Service can be used at various times to determine if a given merchant provides shipping to a given set of locations.

To begin a checkout process from a merchant web site or from an app provided on a mobile device 285, a merchant landing page is displayed which includes an acceptance mark 100 (in this example, PAYPASS™). The consumer selects the acceptance button 310 to access the network of wallets service.

Programming applications running on a processing device in the back-end (server) 290 of the merchant web site or app retrieve a checkout identifier, consumer key and developer private key from local storage 320. The consumer key and developer private key are sent to the host (PAYPASS™) server 300 hosting the network of wallets service to get a Request Token and Authorize Wallet URL 330 from an open API. The Request Token and Authorize Wallet URL are generated and returned 340 to the merchant 290 and forwarded to the merchant web site along with various merchant data, such as the merchant's accepted card types, International Shipping Boolean, and a Checkout Identifier 350, for redirecting the consumer to an interstitial landing page 355 for sign-in to the network of wallets and wallet selection.

The interstitial landing page, which includes a sign-in menu for capturing login credentials and a wallet selector, is preferably displayed 360 with the merchant's branding from a network-of-wallets hosted (PAYPASS™) checkout site 362. The fields on the login page for capturing credentials are preferably encrypted with a key issued by the wallet owner. The wallet selector includes those digital wallets that are available in the network of wallets and accepted by the merchant.

When the consumer selects a partner wallet 364 from the wallet selector, the consumer is directed to a partner site which hosts and maintains the partner digital wallet. The PayPass Wallet Services 300 executes a Checkout Initialization transaction with the partner hosted wallet selected 366 to start the sign in process. The partner wallet presents an interface to the user for logging in 368, selecting a payment method 370 and a shipping address (if applicable) 372 and confirming the order 374. An Address Verification Service (see FIG. 4B) 332 is invoked during the Checkout Initialization, either before or after selecting the shipping address 372, to confirm that the Merchant is willing to ship to each shipping address listed (or selected). The user wallet and payment credential experience is controlled by the partner for a partner-hosted wallet. The consumer can review the order 374 before selecting an "AuthorizeOrder" option 334, for example, to initiate the Checkout Authorization process to continue with the checkout. When ready for checkout, the partner site sends the flow back to the PayPass Wallet Services 300 for executing the Checkout Authorization transaction through an open API, passing in the Request Token, payment method, shipping address and details, and preferably a transaction ID 334.

In the Checkout Authorization process, the Request Token is authenticated, and the payment method selected and any details of the purchase including shipping address, consumer contact information, and merchantID from the consumer's digital wallet are passed from the partner site to the PayPass server 300, where it is stored in a temporary store or database, referred to herein as "Temp Store," as a unique record in a relational database object. The Temp Store database preferably stores all checkout details from the partner wallet for that consumer required to complete the purchase, including a payment method, shipping address, contact, a network of wallets' provider ID, and a merchant ID, for example. The PayPass server 300 generates a network of wallets (PayPass) Checkout Resource URL and verifier for obtaining an Access Token in order to retrieve the information temporarily persisted or stored in the Temp Store, and a Merchant Postback URL 378, the site to which the browser or app will redirect control back to the merchant and passes the URL and verifier back to the merchant using the Merchant Postback URL 380.

After the checkout is authorized by the PayPass server, the process continues by directing flow back to the Merchant from the partner wallet using the Merchant Postback URL 380 provided by the PayPass server 300. At this point, control is passed back to the merchant web site, which captures the Checkout Resource URL and verifier 382, and uses the Request Token and verifier together to obtain the Access Token from the PayPass server 384. The PayPass server generates and returns the Access Token 386 to the merchant 290 (for the purpose of obtaining access to the payment details), which then sends the Access Token to the partner-hosted Checkout Resource URL to retrieve the payment method and details, including shipping address, from the Temp Store 388. The data is retrieved from Temp Store 390 and a response with details from Temp Store is returned to the merchant 392 and used in the submission of a financial payment transaction from the merchant.

Temp Store is purged either when it expires (assuming it was not retrieved) within minutes, or immediately after the data is accessed by the merchant.

The merchant 285 can then display an order confirmation page 394. At this point, control is back to the merchant and any desired additional checkout options can be presented to the consumer prior to submitting the transaction details to a payment gateway 396 for finalizing and confirming completion of the purchase 398.

Figure 4A:
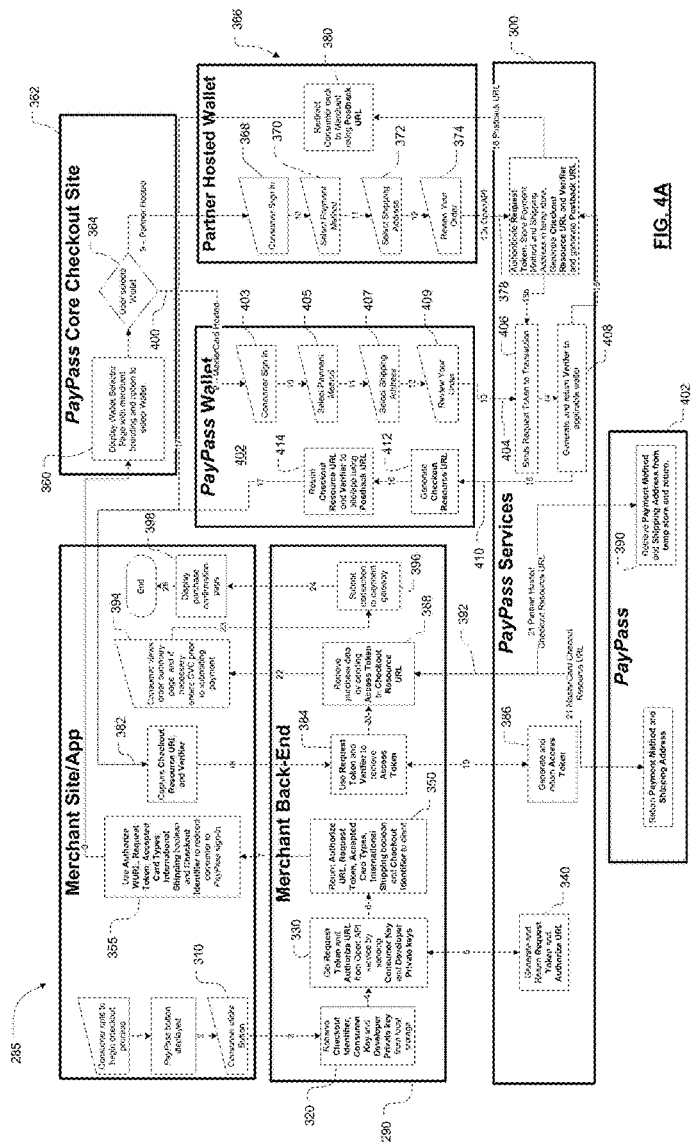
FIG. 4A is a system flow representation of a checkout transaction with a partner-hosted wallet in accordance with an embodiment of a system and method of the present disclosure.
Figure 4B:
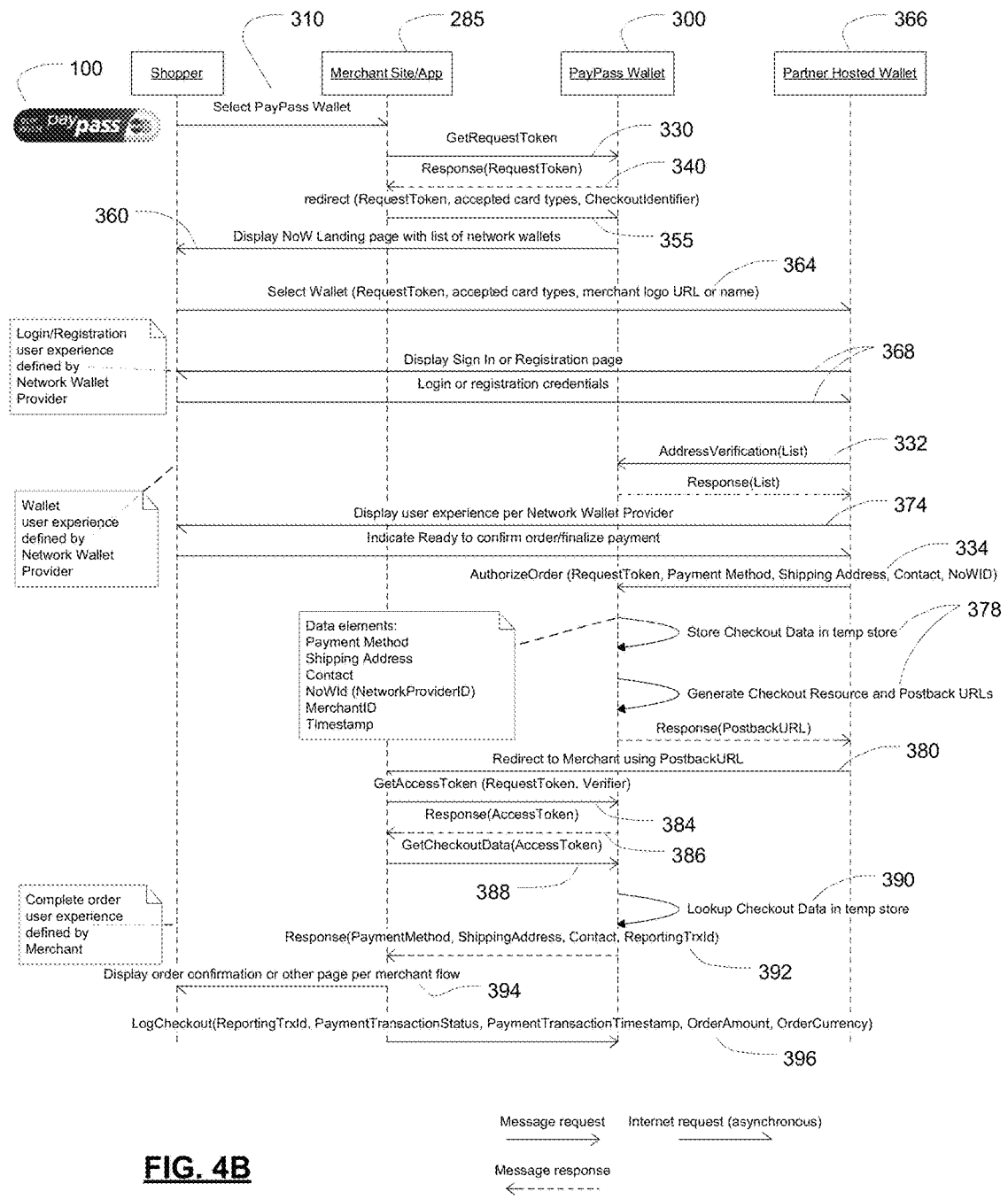
FIG. 4B is a sequence diagram for the method of FIG. 4A for completing a digital wallet transaction in accordance with the present disclosure.

For comparison, FIG. 4A also shows the flow of a transaction initiated after a purchaser selects 400 a wallet, which is a hero or host wallet (PayPass Wallet), from the wallet selector. In this case, once the login credentials are captured from the hero site 402 and forwarded to the server 404, the Request Token is authenticated, as it was for the partner wallet, the authentication service binding the Request Token to the transaction 406 and generating and returning the Verifier to the applicable wallet 408, in this case, to the hero wallet 402. A Checkout Resource URL is generated 412 and the Checkout Resource URL and Verifier to the applicable (hero) wallet are returned to the merchant using a postback Merchant URL.

Other embodiments of partner wallets in the network of wallets are possible offering varying levels of control by the partner and various integration points into the acceptance network of wallets, referred to as co-branded wallets. For example, a non-federated co-branded "White Label" option allows the partner wallet to be hosted, controlled, and maintained by the host (MASTERCARD® or PAYPASS™) server. The consumer selects and logs into the partner wallet site, which is hyperlinked to the PayPass-hosted White Label partner wallet. All consumer data and login credentials are preferably bulk-uploaded and stored in secure containers maintained by the host for the partner or provisioned to the cloud. The partner provides a bulk upload of consumer and card data to the PayPass database, or provisions the cloud for use in the network of wallets.

Figure 5A:
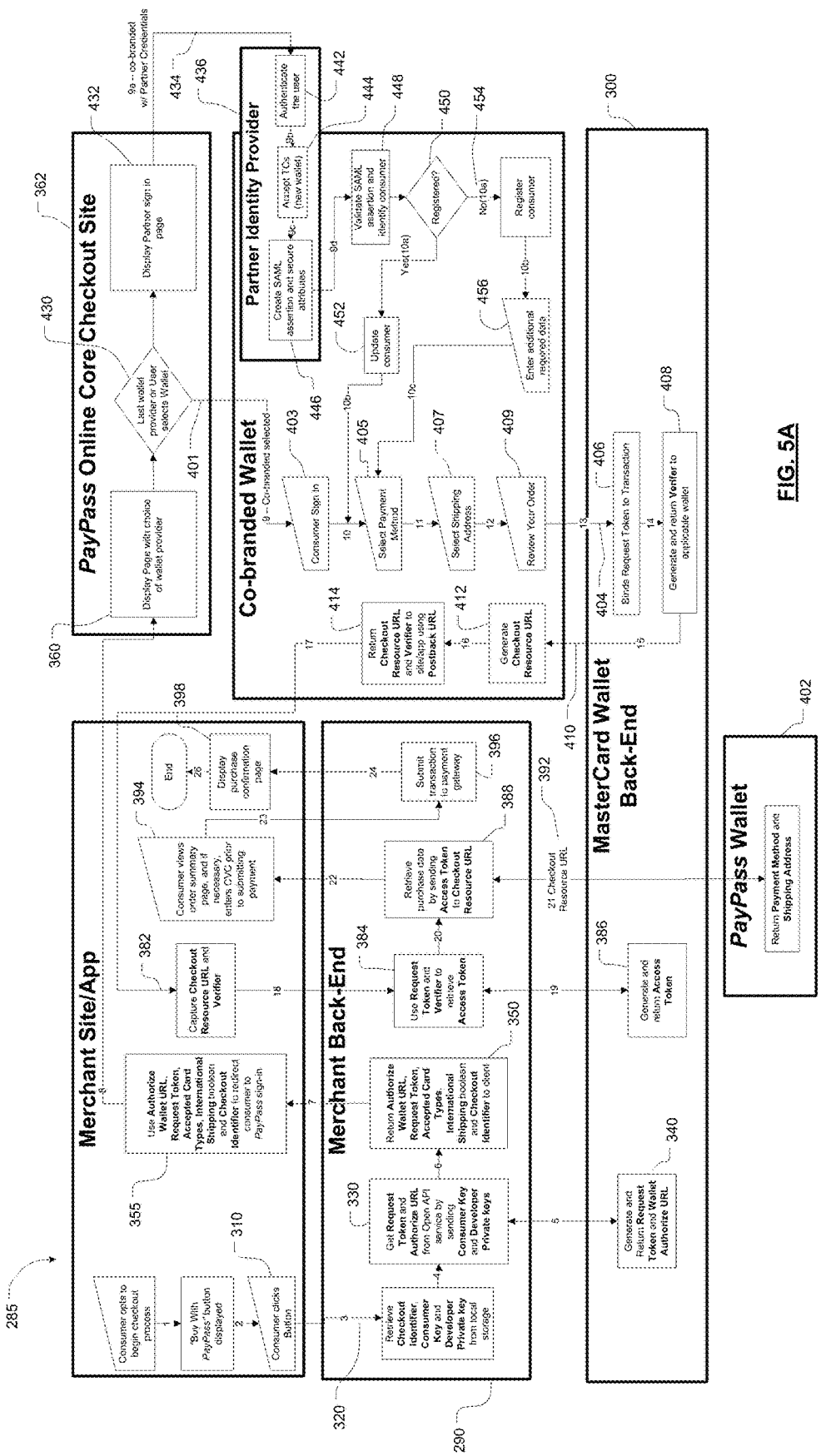
FIG. 5A is a system flow representation of a checkout transaction with partner login and direct provisioning in accordance with another embodiment of a method of the present disclosure.

As shown in FIG. 5A, if the consumer selects a non-federated co-branded wallet 401, the process flow, including the Checkout Initialization and Checkout Authorization, to complete a purchase order through the network of wallets acceptance button on a merchant page is essentially a clone of the hero wallet shown in FIG. 4A. Control never leaves the host, except that the partner wallet's brand is displayed in the wallet selector landing page and subsequent landing pages after selection of the co-branded partner wallet. The partner creates the "skin" with its brand for the landing pages, including login and shipping pages, and provides the skins to the host which can be stored in a partner container in the host database. The co-branded landing page is displayed to the consumer after selection of the co-branded partner wallet, and while hosted on the PayPass server, appears to the consumer to be a partner hosted wallet. The login credentials and card are validated by the PayPass server and the partner is responsible for providing updates.

Figure 5B:
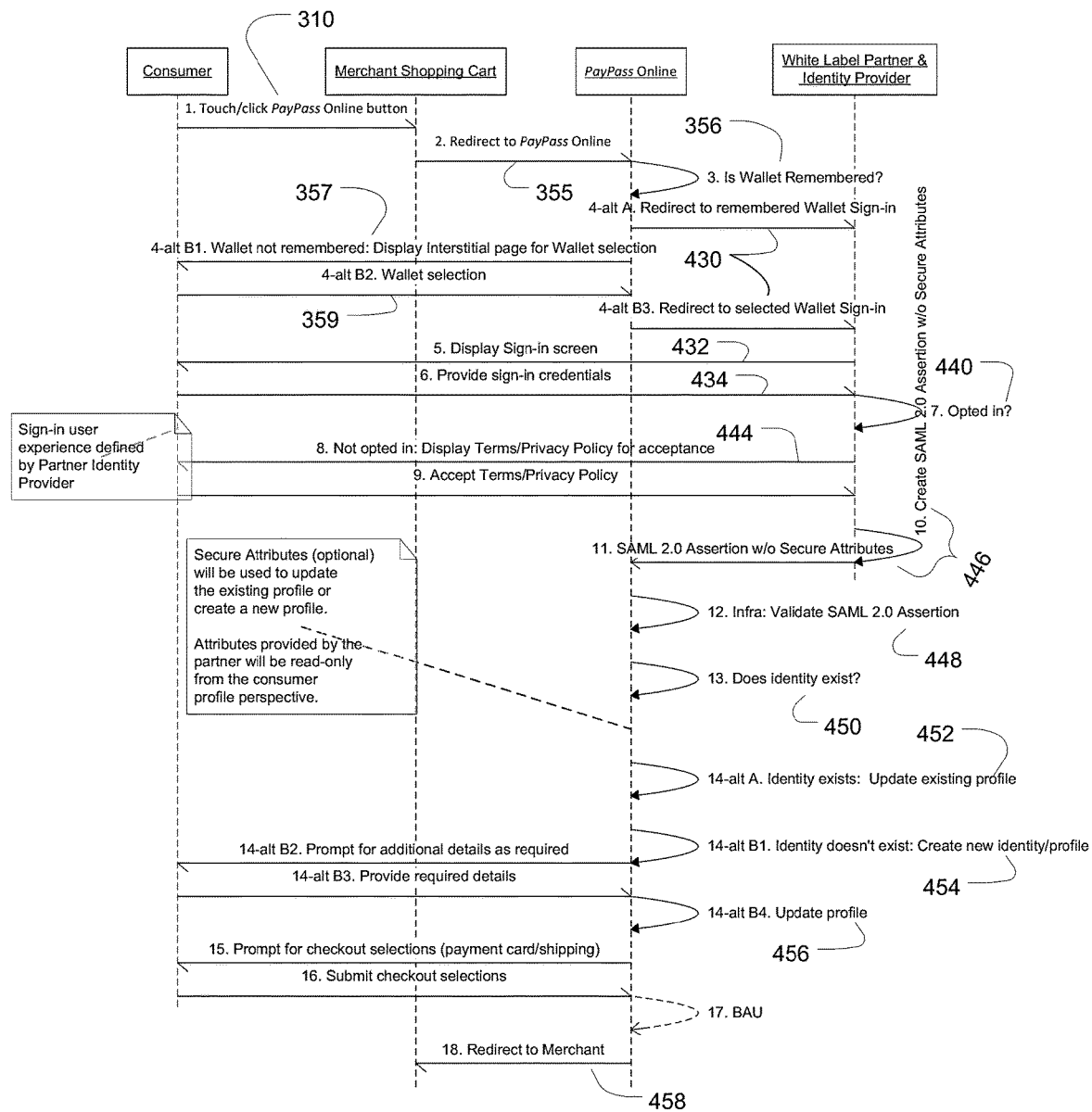
FIG. 5B is a sequence diagram for the method of FIG. 5A for completing a digital wallet transaction in accordance with the present disclosure.

Referring to FIGS. 5A and 5B, another co-branded digital wallet option available to partners in the network of wallets is a federated, skinned White Label partner wallet that uses partner login credentials by framing the login and password prompts in a widget for accessing the wallet owner (partner) site, while the interstitial landing page 120 is a user interface hosted by the network of wallets host. The consumer's login credentials 123 are captured and validated by the partner and are federated to the network of wallets. No wallet creation and setup is required if the customer's login credentials already exist for one of the wallet owner cards. The consumer interacts with the White Label wallet without requiring an additional login sequence. The partner supplies the user experience and functionality to support authentication and password recovery within their own hosted web/mobile property. All other data and services are hosted by the network of wallets.

In one embodiment, when ready to initiate a purchase on a merchant site, a customer selects the acceptance button and is directed to the federated White Label wallet via the selector interstitial page. The consumer logs in to the partner wallet site from the landing page and login access and validation is handled at the partner site. The credentials are then passed to the host network of wallets service in a single login seamless to the customer. The federated single sign-on capability is preferably provided by SAML integration of the partner with the network of wallets host services. The partner controls access to their White Label Wallet and passes federated credentials via SAML 2.0, for example, to PayPass online hosting services for access. The partner sends a SAML token to the host network of wallets services, and a security assertion data logs the customer into the network of wallets. The token contains customer data attributes to setup the wallet and to insert cards into the wallet automatically.

This digital wallet option also allows direct partner provisioning. In other words, each time the recognized consumer of this type of federated skinned partner wallet logs in to the wallet, the partner feeds existing consumer data dynamically into a wallet. This data includes profile information, payment cards and addresses. The data is encrypted, supplied as an extension to the SAML token exchange and refreshed with each consumer login.

FIG. 5A depicts the flow of the checkout process when the consumer is leveraging a federated White Label Partner wallet with partner login credentials. The browser will remember the last wallet selected, minimizing the number of steps in the consumer sign-in process. In the case where the last wallet is unknown, the consumer will be presented with a NoW (PayPass) hosted page listing of wallet providers allowing the consumer to select a wallet and sign-in. The partner provides and maintains the consumer experience and services to authenticate the consumer, in turn providing assertion of identity for the consumer to NoW. The partner also provides consumer cardholder and profile data for the purposes of registering and refreshing a consumer's data, and captures email addresses and mobile telephone numbers for cardholders, which are passed to the network of wallets server to create a wallet account for the user.

Referring to FIGS. 5A and 5B, for the recognized user of a federated White Label (co-branded) wallet, when the consumer clicks on the acceptance button 100 from a merchant page to initiate checkout, the process steps and flow for retrieving a Request Token and Authorize Wallet URL and redirecting the consumer to the Network of Wallets checkout site 362 are the same as for the partner-hosted and hero wallets. Once flow is directed from the merchant site to the NoW site 355, if the wallet is remembered 356, flow is directed to the default wallet (co-branded) page 430. If no wallet is remembered (unrecognized user) 357, an interstitial page for wallet selection is displayed to the consumer 359. Upon selection by the consumer, flow is directed to the wallet co-branded page 430.

If the federated co-branded wallet is selected or defaulted to, the wallet is displayed for log-in 432 and the consumer enters sign-on credentials (login and password) 434 through the partner-hosted widget for capture of login credentials directly by a partner identity provider 436. The partner authenticates the user 442 and if a new wallet is being created (the user has not yet opted in to the co-branded wallet 440), requires the user to accept terms and conditions 444, and creates SAML assertion and, optionally, secure attributes 446, and passes the SAML assertion to the network of wallets' co-branded wallet services. The NoW validates the SAML assertion 448 and determines if the consumer identity exists in the NoW 450. If the consumer is identified as a registered user of the NoW 452, the consumer data is provisioned from the partner and updated to the NoW before proceeding. If a profile of the consumer does not exist (not a previously registered user), a new consumer profile and identity is created 454, and additional details as required to complete a purchase, such as payment method and shipping address, are requested and entered by the consumer 456 before redirecting flow to the merchant 458 to complete the checkout process.

Additional Enhancements of the Consumer Experience during Checkout: Express Checkout In various embodiments, an express checkout option is available to a consumer after opting to make a purchase through the network of wallets, which avoids the extra step of selecting a shipping address in addition to a payment card. This express checkout option is also applicable to other digital wallet options, not only those provided within a network of wallets. In one embodiment, a consumer registers for at least one of the digital wallets available in the network of wallets, and establishes a default card and shipping address. The consumer selects an acceptance mark 100 available from a merchant page (e.g., PAYPASS™) to access the network of wallets after a consumer places their items in a merchant's shopping cart. Because a consumer has previously established and accessed a wallet, the consumer is brought to the default wallet page. Recognition can be through cookies or device detection/finger printing, for example. As a recognized user, the username is pre-populated and the default wallet is highlighted and receives hero placement. If the consumer opts to use a different wallet, other wallet options can be chosen from a wallet selector provided on the wallet page.

Next, the consumer enters his/her password and selects an Express Checkout Button, so that the consumer is not brought to a card and shipping address page. Instead, the consumer's default card and address are automatically used and the consumer is not required to review them. The consumer is brought back to the merchant page, which displays the card and address details that were passed directly to the merchant via an API.

Optionally, prior to bringing the consumer back to the merchant page, an interstitial page is provided by the selected (default) wallet for confirming the details of the credit card, which is preferably referred to by a previously established nickname or by the last 4 digits of the card. The consumer clicks on a button to confirm the order and details and is then brought back to the merchant page.

Checkout Enhancements

Various additional embodiments of the system and method of the present disclosure are directed to in-wallet checkout enhancements available before control is redirected back to the merchant web page. In a current, known on-line checkout experience, a consumer logs in to a wallet or credit card from a merchant's checkout page. The wallet stores credit card and the associated billing address and shipping addresses, which can be used to populate address fields. During checkout, the consumer logs into the wallet, and selects a credit card and shipping address. A shipping option selection and order review, which includes shipping and tax charges, is only available to the consumer after leaving the wallet services pages, including shipping and card information, and arriving on the merchant site. No transaction history or spend tracking is available.

Figure 6:
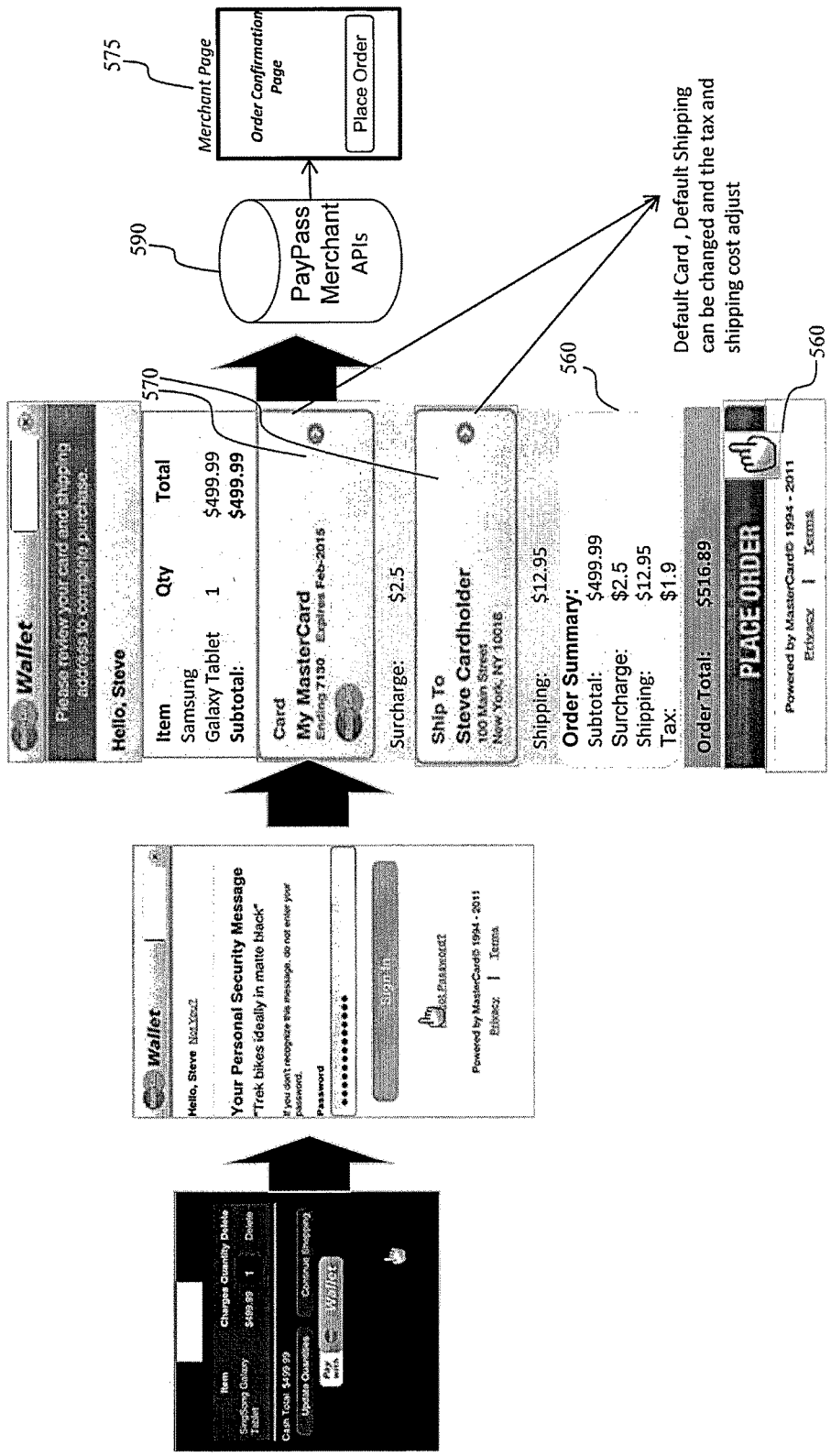
FIG. 6 is a representation of a flow sequence on checkout with in-wallet dynamic update of shopping order details in accordance with an embodiment of a method of the present disclosure.

In various embodiments of the present system, improvements to the in-wallet checkout experience and added functionality for tracking wallet usage and expenditures are available. For example, in one embodiment, services are provided to enable a digital wallet to dynamically update the shopping order total with particular details, such as surcharge, shipping cost and tax. Such selections can be offered within the wallet interface, based on consumer selection of the credit card and shipping address. Additional details such as shipping options and costs associated therewith can also be provided. In particular embodiments, such details can be displayed dynamically when a consumer uses a mouse to hover over a particular wallet available in the network of wallets. Or, as shown in FIG. 6, the details can be displayed and updated dynamically in a frame 560 with each combination of card and shipping details entered 570. Accordingly, the consumer is made aware of the charges that apply to the purchase within a particular wallet and can exercise several choices before placing the order 580 and exiting the wallet services. Such choices include which card to use based on which has a lower surcharge, or which location to ship to, based on shipping charges, or which shipping option to choose based on need and cost.

This enhancement of the user's checkout experience provides a capability not currently available to consumers in choosing a particular credit card to use in a sales transaction. In particular, surcharge is a charge imposed by merchants for accepting credit cards which is then passed on to the consumers. Merchants have the ability to set these rates on credit cards, some of which carry higher rates. The proposed enhancement allows the wallet service to dynamically display the surcharge rate and charge associated with the card the consumer has selected, so that the consumer can make a choice within the wallet service of selecting a different card with a lower surcharge.

Upon placing the order, the information is aggregated and transmitted to the merchant through application programming interfaces (API's) 590. The merchant retrieves the consumer data provided and displays an order confirmation page 575 to the consumer.

A history of a consumer's spending using a particular wallet can also be provided, so that the consumer does not have to look at multiple statements from multiple payment cards to track one's spending. The 'History' section of the wallet preferably includes stored details of purchases made with each payment card within the network of wallets, and tracks purchases made. Such details can include date, merchant, card used, and shipping address.

Figure 7:
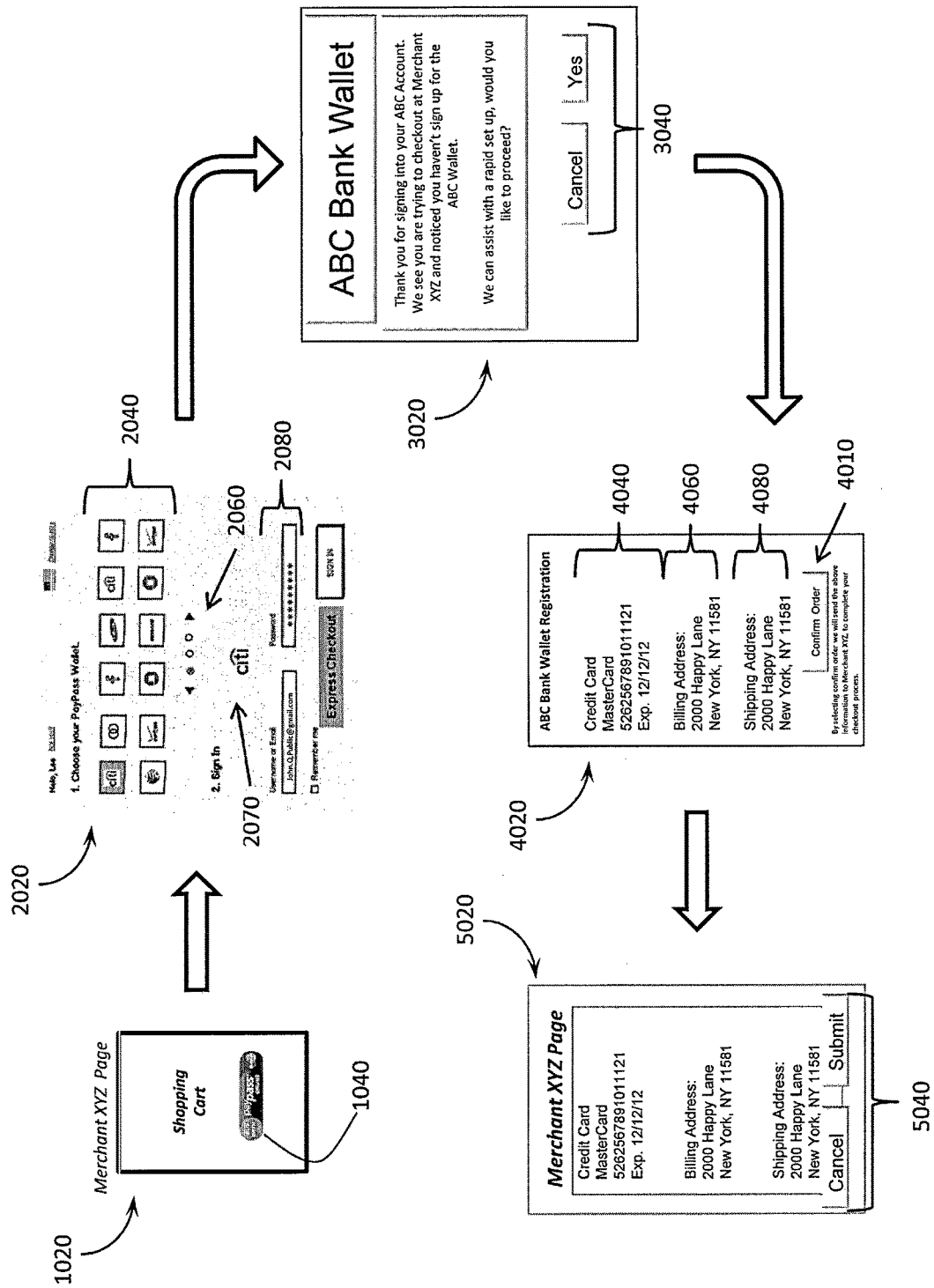
FIG. 7 is a representation of a flow sequence for real-time wallet creation in accordance with an embodiment of a method of the present disclosure.

FIG. 7 is a schematic representation of a real-time interstitial electronic wallet creation process, depicted using a mobile phone-based payment/authentication system.

Referring now to FIG. 7, illustrated is an exemplary process by which a credentialed user may create an electronic wallet in real time. The purchaser has selected certain goods or services to be purchased from a participating merchant, and arrives at either a checkout page or a shopping cart page, represented at 1020. The purchaser is offered the option or opportunity to complete the purchase using the network of wallets which is represented by an icon 1040. In the exemplary embodiment, the network of wallets is operated under the name "PayPass Online", PAYPASS™ being a trademark of MasterCard International Incorporated, the assignee of the instant application.

Having selected the network of wallets icon 1040 to process payment for the transaction, the purchaser is presented with an interstitial page 2020 which prompts the purchaser to select the provider of their chosen wallet from among the partners participating in the network of wallets and displayed at 2040, including optional page select function 2060 or equivalent (rotating panes, daisy-wheel, etc., as described elsewhere herein). Having selected a partner wallet provider, for example ABC Bank. (The use of various symbols to represent partner wallet providers is by way of illustration only, and does not necessarily imply affiliation or endorsement by the respective symbol owners or any related entities, nor their agreement to participate in the network of wallets as described in this or any related application), selection may be highlighted among the display of partners 2040, and/or optionally displayed again, as at 2070. The purchaser is further prompted to enter a login username and password credentials 2080 associated with their selected partner wallet provider.

The case contemplated here, as depicted in FIG. 7 and described, is applicable to only a subset of all purchasers. Namely, the purchaser will have previously established identity credentials (e.g., login ID and password) with the partner provider they select at 2040. The purchaser can therefore be verified by the respective partner, but does not have an established electronic wallet with a particular partner. It may be the case that a purchaser has established demand deposit account (DDA, e.g., checking or savings) with the banking institution that includes online banking service, and a login/password pair to access them, but does not have an established electronic wallet with that partner. That purchaser may simply be unaware of the wallet service offered by the banking partner, and may have clicked/selected the network of wallets checkout icon 1040 inadvertently, or out of curiosity. Alternately or additionally, the banking partner may selectively offer electronic wallet services to less than all of their customers, as an incentive or service enhancement. In the latter case, the subset of purchasers to whom the present method is applicable is still narrower, as determined by their eligibility to create an electronic wallet with the selected partner banking institution.

However, the presumed case is that the purchaser has not yet established a wallet with that partner. Therefore, the partner would authenticate the purchaser to the operator of the network of wallets. The purchaser is then presented with a further page 3020, which confirms to the purchaser that their identity is recognized. In the case that the purchaser is eligible to open an electronic wallet with the partner, but has not yet done so, the purchaser is presented with the opportunity to establish a wallet with the partner immediately, which the purchaser may accept or decline at 3040. A purchaser who is authenticated using their established credentials with the banking partner, but is ineligible to create an electronic wallet with that partner for whatever reason, and/or declines to create an electronic wallet, may be returned to either the network of wallets interstitial login screen 2020, for example to select another wallet provider, or alternately to the merchant checkout page 1020.

Where the purchaser accepts the invitation and chooses to create a wallet, the purchaser's wallet details are pre-populated based upon information known to the partner about the purchaser associated with the existing credentials and presented to the purchaser for verification 4020. The wallet details include the relevant payment card numbers 4040, a billing address associated with the payment card 4060, and a shipping address 4080 where goods may be delivered. The purchaser must then confirm the pre-populated details 4100 to proceed with the transaction.

Upon confirming the wallet and payment details, the purchaser is returned to the merchant page. The operator of the network of wallets with have contemporaneously transmitted the necessary transaction details, e.g., card number details, billing and shipping addresses, etc. to the merchant, which are again presented to the purchaser from the merchant's page 5020. The purchaser then has only to confirm the order by selecting the corresponding option at 5040.

The purchaser will then have established a partner wallet in the federated network of wallets. Upon the purchaser's next transaction where the network of wallets is invoked, their existing wallet may be recognized. Furthermore, the purchaser may consent to a software cookie to be stored on the purchaser's system, which can be used to auto-identify the purchaser, at least in part. For example, upon the purchaser's next invocation of the network of wallets, their existing wallet may be recognized, and that wallet provider pre-selected. The purchaser then has only to enter the appropriate username and password, thereby streamlining the checkout process. Moreover, as will be apparent, on subsequent logins by the same purchaser the need to create a new wallet with respect to that same partner, as described herein is obviated.

Health Check Option

An optional additional feature of the user interface for access to the Network of Wallets and/or the wallet selector page is what can be referred to as a "health check" of available wallets. Consider that an electronic wallet may be provided with one or more debit or credit accounts, and/or one or more pre-paid cards or accounts. A debit or credit account may be limited in balance by the available account balance in a demand deposit account associated with a given debit card, the available credit limit of a credit account associated with a given credit card. Additionally, the balance on a given pre-paid card or account may be limited or exhausted.

In order to improve the customer experience, information about the state of one or more wallets may be conveyed early in the checkout process. This would be preferred over an alternative scenario wherein the user would select a wallet without regard to available balance, for example, then continue to nearly complete the checkout process to the point where the merchant authorizes the charges, only to have those charges declined, for example because of insufficient available balance.

Therefore, in one embodiment, once the user is logged into the network of wallets, whether directly or via a partner login, a listing or other graphic or textural device indicating a choice of wallets may include information regarding the state of health for a given wallet. For example, reference may be made to the amount of the merchant transaction that precipitated the network of wallets login, as compared to available balance in the wallet. Other limiting factors besides available balance that would prevent a transaction from being completed may be the class of merchant with regard to restriction placed upon one or more payment sources stored in a given electronic wallet, effective reducing the available balance for that transaction. In other cases, the card or cards associated with a given wallet may be expired. In still others, a prior attempt to transact on a particular wallet may have failed for unknown reasons. Most preferably, any foreseeable reason why the instant transaction may be declined with reference to a particular wallet and transaction should be considered as part of the health check.

The health check information may be conveyed, for example, by selecting an order of listing available wallets. More specifically, any that do not have the capacity to complete a transaction may be ordered lower in the selection listing than another available wallet having ability to complete the transaction. With regard to a graphical representation such as the switch, flip (rotating pane) or daisy wheel described herein elsewhere (and without limitation to those graphical devices), an 'unhealthy' wallet with reference to the instant transaction may be positioned less conveniently than others, may be showing in a different shade or color (e.g., gray tone), or may simply be hidden altogether. Some combination of indications may be used as well.

Alternately, the user may identified by cookies placed on the user's access device from a prior use of an electronic wallet associated with the network of wallets. In this case, the state of health of a wallet may be indicated even before the user logs into the network, and may aid the user in selecting a wallet partner via which they choose to login.

In additional embodiments, it is further contemplated that the user experience be enhanced by including an identifiable link or graphic icon which the user may associate with the network of wallets, even or especially while interacting with one of the federated partners in the network of wallets. The link or graphic icon, which we will refer to as a "pin" is preferably small and unobtrusive, yet visible and identifiable. The pin may, for example, expand when hovered upon by a user-selection device (e.g., mouse pointer). Such hovering over and/or selection of the pin by a user will transfer the user from the partner site to the network of wallets site, for example to select a different wallet or wallet provider. Alternately or additionally, the user may be presented with a selection of partner wallets to transfer directly to.

An additional feature which may be integrated into the network of wallets checkout experience is a shopping cart. The network of wallets as described herein can be entered from the merchant's checkout page, for example, via a clickable icon. Data concerning the pending transaction (seller, description, quantity, price, terms, etc.) are passed to network operator in the course of processing the checkout transaction. Optionally, in certain embodiments, this information may be made available to the user during the course of their interactions with the network of wallets (e.g., login, wallet selection, etc.).

In one particular embodiment, the shopping cart is integrated with the pin described above. Hovering over the pin initiates an expansion of the pin graphic into a selection of data or alternate destinations for the user. Among these may include the shopping cart, showing a precis of pertinent data to the pending transaction (e.g., seller, description, quantity, price, terms, etc.). Furthermore, it may be convenient to permit the user to select the shopping cart, or items in it, and be returned to the merchant site to append or change the transaction.

Although the invention has been described with reference to certain preferred embodiments, it will be appreciated by those skilled in the art that modifications and variations may be made without departing from the spirit and scope of the invention. It should be understood that applicant does not intend to be limited to the particular details described above and illustrated in the accompanying drawings.

What is claimed is:

1. A method for authorizing a digital wallet transaction initiated by a consumer from a merchant web site or app, the method comprising:

providing an acceptance mark on a merchant landing page associated with the merchant web site or app for initiating the digital wallet transaction, the acceptance mark comprising a link to a host server and the link, upon selection of the acceptance mark by the consumer, accessing an acceptance network for authorizing payment and providing access to a plurality of digital wallets of the consumer hosted by a wallet server, each of the plurality of digital wallets containing a plurality of payment cards associated with and being selectable by the consumer, and each of the plurality of digital wallets being selectable by the consumer;

receiving a selection by the consumer of the acceptance mark;

receiving a wallet selection by the consumer, the wallet selection selecting one of the plurality of digital wallets of the consumer in the acceptance network;

routing the digital wallet transaction to the digital wallet in the acceptance network selected by the consumer from the plurality of digital wallets of the consumer, the selected digital wallet capturing and validating log-in credentials provided by the consumer;

receiving a card selection by the consumer, the card selection selecting one of the plurality of payment cards in the selected digital wallet, the selected one of the plurality of payment cards having a shipping address associated therewith;

receiving, by the host server from the wallet server of the selected digital wallet, the digital wallet transaction with purchase details including the selected one of the plurality of payment cards and the associated shipping address;

storing, by the host server, details for completing the purchase based on the purchase details;

the host server generating a merchant postback URL associated with the merchant web site or app, an Access Token and a checkout resource URL associated with the selected digital wallet for retrieving the purchase details, the Access Token configured to provide access to the stored details; and redirecting, by the host server, the digital wallet transaction directly back to the merchant web site or app using the postback merchant URL, the merchant web site or app obtaining the Access Token from the host server and sending the access token to the checkout resource URL to retrieve the stored details for authorizing and completing the digital wallet transaction.

2. The method of claim 1, further comprising displaying an interstitial page comprising a wallet selector switch in response to the consumer selecting the acceptance mark, the consumer selecting the digital wallet from the plurality of digital wallets for the transaction using the wallet selector switch.

3. The method of claim 2, further comprising associating a coupon or offer with each of the plurality of digital wallets and displaying the coupon or offer associated with one of the plurality of digital wallets displayed on the wallet selector switch.

4. The method of claim 3, the displaying step comprising displaying the coupon or offer in response to the consumer hovering a pointer over the one of the plurality of digital wallets displayed.

5. The method of claim 4, further comprising communicating the coupon or offer associated with the one of the plurality of digital wallets to the merchant web site or app prior to completing the digital wallet transaction, wherein the one of the plurality of digital wallets is the digital wallet selected from the plurality of digital wallets for the transaction.

6. The method of claim 2, further comprising associating a status with each of the plurality of digital wallets and displaying a graphical indicator of the status on the wallet selector switch.

7. The method of claim 6, wherein the status is an indicator of a capability to complete the transaction with the associated digital wallet, the indicator being associated with at least one of an amount of funds required for the transaction, a balance of available funds in the associated digital wallet, a class of merchant, a type of goods or services being purchased, an expiration of one or more cards associated with the digital wallet, and whether a prior transaction using the digital wallet had failed.

8. The method of claim 2, further comprising providing a history toggle on the interstitial page, the history toggle providing access to the historical purchase data of a recognized consumer of the network of wallets, the historical purchase data including data associated with each payment card registered to the consumer within the acceptance network.

9. The method of claim 2, wherein the selected digital wallet is a federated co-branded wallet, the interstitial page being displayed and hosted by the host server, the interstitial page comprising a wallet log-in menu, wherein the log-in credentials entered by the consumer in the log-in menu are captured and validated by a partner server against a partner database, the method comprising framing the log-in menu in a widget for accessing the partner server.

10. The method of claim 9, further comprising federating the captured log-in credentials to the selected wallet in response to the consumer being recognized by the partner server as an authorized user of another partner-hosted product.

11. The method of claim 10, further comprising the partner server sending a SAML token and provisioning details of payment cards and shipping addresses associated with the consumer to the federated co-branded wallet displayed on the host server in response to validating the log-in credentials.

12. The method of claim 11, further comprising automatically creating a new digital wallet account associated with the federated co-branded wallet for the consumer using the captured log-in credentials in response to the consumer being recognized by the host server as an unregistered user of the acceptance network.

13. The method of claim 11, wherein the consumer is a recognized user of the acceptance network, further comprising the partner server automatically updating the details of the payment cards in the federated co-branded wallet associated with the consumer in response to the consumer selecting the federated co-branded wallet for the transaction, the details including consumer contact information, payment cards, and shipping addresses.

14. The method of claim 1, wherein the selected digital wallet is a default wallet, the default wallet being selected prior to the consumer selecting the acceptance mark, further comprising displaying an interstitial page associated with the default wallet in response to the consumer selecting the acceptance mark.

15. The method of claim 14, wherein the consumer is a recognized user of the acceptance network, the default wallet corresponding to one of the plurality of digital wallets most recently accessed by the consumer.

16. The method of claim 14, further comprising the consumer establishing a default payment card and a default shipping address associated with the default digital wallet prior to selecting the acceptance mark, and providing an express checkout button associated with the default wallet, the default payment card and the default shipping address being captured for the transaction in response to the consumer selecting the express checkout button.

17. The method of claim 1, wherein the selected digital wallet is a partner-hosted wallet, the method further comprising storing, by the host server, the purchase details including the selected payment card and shipping address in a temporary store associated with the checkout URL on the host server, and purging the temporary store in response to the merchant web site or app retrieving the purchase details for authorizing the digital wallet transaction.

18. The method of claim 1, further comprising the host server displaying a shopping order confirmation page prior to redirecting the transaction back to the merchant web site or app, the shopping order confirmation page including the purchase details, the purchase details including shipping charges, taxes, and a surcharge rate and charge associated with the digital wallet selected, and dynamically updating the shopping order confirmation page in response to the consumer selecting a different one of the plurality of digital wallets for the digital wallet.

19. The method of claim 1, further comprising returning a Request Token generated by the host server in response to the consumer selecting the acceptance mark, and the host server generating a verifier associated with the Access Token, the merchant web site or app capturing the checkout resource URL and the verifier after the transaction is redirected back to the merchant web site or app, the merchant web site or app using the Request Token and verifier to retrieve the Access Token from the host server for sending to the checkout resource URL and retrieving the purchase details.

20. The method of claim 1, further comprising displaying an interstitial page comprising a wallet selector switch and a wallet log-in menu in response to the consumer selecting the acceptance mark, the consumer entering log-in credentials in the wallet log-in menu associated with a digital wallet selected from the plurality of digital wallets for the transaction.

* * * * *